(12) United States Patent
Ebina et al.

(10) Patent No.: US 8,178,194 B2
(45) Date of Patent: May 15, 2012

(54) CLAY FILM PRODUCT

(75) Inventors: Takeo Ebina, Sendai (JP); Fujio Mizukami, Sendai (JP); Ryo Ishii, Sendai (JP); Kiyoshi Kobayashi, Sendai (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 671 days.

(21) Appl. No.: 11/721,403

(22) PCT Filed: Dec. 11, 2005

(86) PCT No.: PCT/JP2005/022702
§ 371 (c)(1),
(2), (4) Date: Jun. 11, 2007

(87) PCT Pub. No.: WO2006/062209
PCT Pub. Date: Jun. 15, 2006

(65) Prior Publication Data
US 2009/0274860 A1 Nov. 5, 2009

(30) Foreign Application Priority Data

| Dec. 10, 2004 | (JP) | 2004-358157 |
| Dec. 10, 2004 | (JP) | 2004-358627 |
| Dec. 10, 2004 | (JP) | 2004-358732 |
| Dec. 10, 2004 | (JP) | 2004-358783 |
| Feb. 22, 2005 | (JP) | 2005-046324 |
| Feb. 22, 2005 | (JP) | 2005-046325 |

(51) Int. Cl.
*B32B 9/04* (2006.01)
*B32B 27/40* (2006.01)
*B32B 3/02* (2006.01)
*C08K 3/34* (2006.01)
*C04B 33/00* (2006.01)

(52) U.S. Cl. .... 428/220; 428/64.1; 428/454; 428/425.5; 423/328.1; 524/445; 501/141

(58) Field of Classification Search .............. 428/64.1, 428/454, 425.5, 220, 343; 524/445; 501/141; 423/328.1
See application file for complete search history.

(56) References Cited

U.S. PATENT DOCUMENTS
2003/0004248 A1* 1/2003 Wakamura et al. .......... 524/441
(Continued)

FOREIGN PATENT DOCUMENTS
JP 50 2699 1/1975
(Continued)

OTHER PUBLICATIONS

Machine_English_Translation_JP_2003095639_A, Suzuki, Powdery Repellent Layer-State Silicate, Its Producing Method, and Cosmetic Containing the Same, Apr. 3, 2003, JPO, pp. 1-21.*

(Continued)

*Primary Examiner* — David Sample
*Assistant Examiner* — Tahseen N Khan
(74) *Attorney, Agent, or Firm* — Oblon, Spivak, McClelland, Maier & Neustadt, L.L.P.

(57) ABSTRACT

The present invention provides a clay film and a member thereof, having low moisture permeability and gas permeability, having mechanical strength enabling use as a self-supporting film, having high flexibility and high heat resistance, being an electrical insulator and having low thermal conductivity; a clay film comprising clay alone, clay and a small amount of a reinforcing material, or clay, a small amount of an additive and a small amount of a reinforcing material and subjected to surface treatment; a clay film comprising clay and a small amount of a reinforcing material, or clay, a small amount of an additive and a small amount of a fibrous reinforcing material, and having gas impermeability; a multilayer film comprising a fabric and clay and having a composite multilayer structure comprising a clay layer and a fabric; and, an adhesive clay film having clay for a main component thereof and a single layer or multilayer structure in which an adhesive layer is preset on the clay film.

28 Claims, 6 Drawing Sheets

U.S. PATENT DOCUMENTS

| | | | |
|---|---|---|---|
| 2004/0030020 A1* | 2/2004 | Liang et al. | 524/442 |
| 2004/0030021 A1* | 2/2004 | Mitsunaga et al. | 524/442 |
| 2007/0027248 A1 | 2/2007 | Ebina et al. | |

FOREIGN PATENT DOCUMENTS

| | | | |
|---|---|---|---|
| JP | 53 39318 | | 4/1978 |
| JP | 55 142539 | | 11/1980 |
| JP | 5 254824 | | 10/1993 |
| JP | 5 262514 | | 10/1993 |
| JP | 6 95290 | | 4/1994 |
| JP | 2002 30255 | | 1/2002 |
| JP | 2003095639 A | * | 4/2003 |

OTHER PUBLICATIONS

"Ryushi ga Kohaiko Shita Keisan en Jiritsu Hakumaku to Gus Barrier Seino", by Takeo Ebina, CSJ: The Chemical Society of Japan Dai 84, Shunki Nenkai-Koen, Yokoshu I, Mar. 11, 2004, whole document.*

English Translation of "Ryushi ga Kohaiko Shita Keisan en Jiritsu Hakumaku to Gus Barrier Seino", entitled "Self-Supported Silicate Thin Film with Highly Oriented Particles and Gas Barrier Performance", Translated by Schreiber Translation, Inc., pp. 1-4, Mar. 2010.*

U.S. Appl. No. 11/997,355, filed Jan. 30, 2008, Ebina, et al.

U.S. Appl. No. 12/029,203, filed Feb. 11, 2008, Ebina, et al.

Haruo Shiramizu, "Clay Mineralogy (Nendo Kobutsu Gaku)—Basics of Clay Science", Asakura Shoten, p. 57, 1988.

Yasushi Umemura, "Preparation of Methylene Blue-Clay Hybrid Films by a Modified Langumir-Blodget Method and Molecular Orientation of Methylene Blue in the Film", Clay Science, vol. 42, No. 4, pp. 218-222, 2003.

* cited by examiner

CLAY FILM PRODUCT

TECHNICAL FIELD

The present invention relates to a clay film and a process for producing same and the like, and more particularly, to a novel clay film and product thereof having mechanical strength enabling use as a self supporting film, high flexibility, high heat resistance, being an electrical insulator and having superior adiabatic properties and moisture resistance. Although it was difficult to produce a clay film having mechanical strength enabling use as a self-supporting film, high flexibility, high heat resistance, being an electrical insulator, having low thermal conductivity and allowing the inclusion of various chemical substances within the film an use of methods of the past in the technical fields of clay thin film production technology and products thereof, the present invention has been developed on the basis of a strong demand for the development of such a film, and provides a novel technology and novel product relating to a clay film having mechanical strength enabling use as a self-supporting film along with superior flexibility, thermal stability and porosity, an electrical insulating member, a heat insulating material and the like.

BACKGROUND ART

Various production processes are typically used under high-temperature conditions in numerous chemical industrial fields. Measures to prevent leakage of liquids and gases are employed in the line couplings and so on of these production lines using, for example, packings and welding. Packings have superior flexibility, for example, were previously made from organic polymer materials. However, the maximum heat resistance of these organic polymer materials was the 350° C. achieved when using liquid crystal polyester, and at temperatures there above, it was necessary to use metal packings. These metal packings, however, had the problem of having inferior flexibility as compared with organic polymer materials. Although aluminum foil or aluminum-deposited film has superior gas impermeability, it is not transparent. In addition, since aluminum foil is a metal, it cannot be used as a sealing material wrapped around threaded portions. In addition, although there are silica-deposited films that are transparent and have superior gas impermeability, since the base material of these silica-deposited films is an organic compound film, it similarly cannot be used under high-temperature conditions above 350° C. In addition to being used as packings, these gas-impermeable materials may also be used by being wrapped around joint threads, wrapped around tubes or affixed to flat members. On the other hand, sheets using clay minerals in the form of mica or vermiculite and the like are used as gland packings used under high-temperature conditions (Japanese Patent Application Laid-Open No. H6-95290, Japanese Patent Application Laid-Open No. H5-254824, Japanese Patent Application Laid-Open No. 2002-30255, Japanese Patent Application Laid-Open No. S50-2699). However, since these sheets cannot be made to be completely free of cracks and pinholes, packings and gaskets fabricated from these sheets have the problem of being unable to completely seal gases.

Clay is known to form a film having an aligned particle orientation by dispersing in water or alcohol, spreading the dispersion onto a glass sheet and allowing to dry by standing undisturbed. For example, azimuth-oriented samples for X-ray analysis have been prepared using this method (Haruo Shiramizu, "Clay Mineralogy (Nendo Kobutsu Gaku)—Basics of Clay Science", Asakura Shoten, p. 57 (1988)). However, in the case of forming a film on a glass sheet, it was difficult to peel the clay film from the glass sheet, cracks formed in the film when peeling from the glass sheet and other problems occurred that made it difficult to obtain a self-supporting film. In addition, even if the film was able to be peeled from the glass sheet, the resulting film was brittle and lacked sufficient strength.

Clay thin films have recently been produced by applying the Langmuir-Blodgett method (Yasushi Umemura, Clay Science, Vol. 42, No. 4, p. 218-222 (2003)). In this method, however, since a clay thin film is formed on the surface of a substrate made from a material such as glass, it was not possible to obtain a clay thin film having the strength of a self-supporting film. Moreover, various methods for preparing, for example, functional clay thin films and the like have been reported in the past. Examples of these methods include a method for producing a clay thin film comprising forming an aqueous dispersion of a hydrotalcite-based interlayer compound into a film followed by drying (Japanese Patent Application Laid-open No. S53-39318), a method for producing a layered clay mineral thin film in which the binding structure possessed by the layered clay mineral is fixed by carrying out heat treatment that promotes a reaction between the layered clay mineral and phosphoric acid or a phosphate group (Japanese Patent Application Laid-open No. S55-142539), and an aqueous composition for film treatment comprising a smectite-based clay mineral and a metal complex compound having a valence of two or more (Japanese Patent Application Laid-open No. H5-262514), and numerous examples of these methods exist. However, a clay film having mechanical strength enabling use as a self-supporting film and superior flexibility has yet to be developed.

In general, clay, and particularly clay having superior plasticity, is easily dispersed in water and can be easily made into a uniform film. In addition, such clay also facilitates the production of complexes due to its superior affinity with hydrophilic chemical substances. Clay offering such advantages conversely has inferior moisture resistance, and if immersed in water, swells and becomes brittle until it finally is unable to maintain its form. Fabrics made from various fibers, such as plain-woven fabrics and non-woven fabrics, are available commercially, and these fabrics are characterized by having adequate mechanical strength, flexibility and durability with respect to repeated bending. The heat resistance and chemical resistance of these fabrics are dependent on the fiber raw materials that compose the fabric. Examples of fibers that compose these fabrics include mineral fibers, glass wool, ceramic fibers, metal fibers, ceramic fibers, plant fibers and organic polymer fibers. However, since these fabrics are unable to completely seal the spaces between fibers, they have the problem of lacking gas impermeability. In the case of practical use of clay films, the clay film is used to as to be in contact with a member made of another type of material in many cases. At this time, fixation, joining and so forth between the clay film and member made from another type of material is required to be able to be carried out easily, uniformly and reliably. In the case of adhering two clay films, it is possible to use an adhesive having high adhesive strength with a clay film. In addition, in the case of adhering a clay film with another type of material such as metal, glass, paper, plastic or rubber, it is possible to use an adhesive capable of adhering both the clay film and the other type of material. These adhesives can be acquired comparatively easily, and clay films or clay films and other types of materials can be adhered by these adhesives. However, the uniform coating of these adhesives onto a clay film followed by the uniform and reliable adhesion thereto has previously been unsuccessful. In the case of adhesives using polar solvents in particular, there is the problem of the clay film being susceptible to swelling. In addition, since a clay film itself has high gas impermeability, considerable time is required for drying and it was difficult to produce a thick film.

DISCLOSURE OF THE INVENTION

With the foregoing in view, during the course of extensive research in consideration of the prior art as described above with the aim of developing a novel clay film having mechanical strength enabling use as a self-supporting film, having superior flexibility, being able to be used under high-temperature conditions, and having superior moisture resistance, the inventors of the present invention found that a clay self-supporting film is obtained by preparing a homogeneous liquid dispersion containing clay, clay and a small amount of an additive, or clay, a small amount of an additive and a small amount of a reinforcing material, pouring this liquid dispersion into a container or coating onto the surface of a support, separating the liquid serving as the dispersion medium by various solid-liquid separation methods such as centrifugal separation, filtration, vacuum drying, freeze-vacuum drying or heated evaporation to obtain a clay film, and separating this from the container or support as necessary. Moreover, a preferable raw material composition and production process were found as a result of further conducting extensive research by focusing on the potential for improving water repellency, waterproofing, tenacity and light transmissivity of a clay film by further carrying out surface treatment, thereby leading to completion of the present invention.

An object of the present invention is to provide a clay film having mechanical strength enabling use as a self-supporting film, superior flexibility and thermal stability, a production technology thereof, and a novel technology and/or novel material such as a member able to be used as an electrical insulator or heat insulating material.

The following provides a more detailed explanation of the present invention.

First, in the present invention, a clay film can be provided comprising clay alone, clay and a small amount of a reinforcing material, or clay, a small amount of an additive and a small amount of a reinforcing material, that has flexibility, can be used as a self-supporting film, has heat resistance, has gas impermeability and is subjected to surface treatment. The present clay film has for the main component thereof a natural clay or synthetic clay, the surface treatment is one or more types of water repellency treatment, waterproofing treatment, reinforcing treatment and surface flattening treatment, and the permeability coefficient with respect to air, oxygen gas, nitrogen gas, hydrogen gas or helium gas at room temperature is less than $1 \times 10^{-12}$ $cm^2s^{-1}$ $cmHg^{-1}$.

In the present invention, a natural or synthetic clay, and preferably either natural smectite or synthetic smectite or a mixture thereof is used for the clay, and this is added to water or a liquid having water for a main component thereof to prepare a dilute, homogeneous liquid dispersion. One or more types selected from the group consisting of mica, vermiculite, montmorillonite, iron montmorillonite, beidellite, saponite, hectorite, stevensite and nontronite can be used for the clay. The concentration of the clay liquid dispersion is preferably 0.5 to 15 percent by weight and more preferably 1 to 10 percent by weight. At this time, if the concentration of the clay liquid dispersion is excessively low, there is the problem of excessive time required for drying. In addition, if the concentration of clay liquid dispersion is excessively high, since the clay is not adequately dispersed, the orientation of the clay particles is poor thereby resulting in the problem of being unable to form a uniform film.

Next, a weighed solid or liquid additive is added to the clay liquid dispersion as necessary to prepare a homogeneous liquid dispersion. There are no particular limitations on the additive provided it improves the flexibility or mechanical strength of the clay film and uniformly mixes with the clay, examples of which include one or more types of ethylene glycol, glycerin, epsilon-caprolactam, dextrin, starch, cellulose-based resin, gelatin, agar, flour, gluten, alkyd resin, polyurethane resin, epoxy resin, fluororesin, acrylic resin, methacrylic resin, phenolic resin, polyamide resin, polyester resin, polyimide resin, polyvinyl resin, polyethylene glycol, polyacrylamide, polyethylene oxide, protein, deoxyribonucleic acid, ribonucleic acid, polyamino acid, polyvalent phenol and benzoic acid compounds.

The weight ratio of the additive based on the total solid content is 30 percent or less and preferably 1 to 10 percent. At this time, if the ratio of the additive is excessively low, the effect of addition is not demonstrated, while if the ratio of the additive is excessively high, the distribution of the additive and clay in the prepared film becomes heterogeneous, and as a result, the homogeneity of the resulting clay film decreases, and the effect of addition is diminished. In addition, the heat resistance of the clay film decreases in the case the ratio of the additive is excessively high.

Next, a weighed reinforcing material is added to the clay liquid dispersion to prepare a homogeneous liquid dispersion. One or more types of mineral fibers, glass wool, carbon fibers, ceramic fibers, plant fibers or organic polymer fiber resin can be used for the reinforcing material. The weight ratio of the reinforcing material based on the tonal solid content is 30 percent or less and preferably 1 to 10 percent. At this time, in the case the ratio of the reinforcing material is excessively low, the effects of addition are not demonstrated, while if the ratio of the reinforcing material is excessively high, the distribution of the reinforcing material and clay in the prepared film becomes heterogeneous, and as a result, the homogeneity of the resulting clay film decreases and the effect of addition is diminished. Furthermore, the order in which the reinforcing material and additive are added is not predetermined, and may be added in either order.

Next, after having poured this liquid dispersion into a container or coated it onto the surface of an object, the liquid of the liquid dispersion is removed by drying to produce a clay film. An example of a method for producing a clay film consists of slowly evaporating the liquid of the liquid dispersion to form a film, and coating the liquid dispersion onto the surface of a support and removing the liquid of the liquid dispersion by drying. Examples of methods for removing the liquid of the liquid dispersion by drying include various solid-liquid separation methods such as centrifugal separation, filtration, vacuum drying, freeze-vacuum drying and heated evaporation or a combination thereof. Among these methods, in the case of, for example, using a method consisting or pouring the liquid dispersion into a container and evaporating by heating, the concentration of the clay is adjusted to 0.5 to 3 percent by weight, the preliminarily degassed liquid dispersion is poured into a support such as a flat tray and preferably a plastic or metal ray, and the liquid dispersion is dried while maintaining in a level state in a forced air oven under temperature conditions of 30 to 70° C. and preferably 30 to 50° C. for about 3 hours to half a day and preferably for 3 to 5 hours to obtain a clay thin film.

In addition, as another example, in the case of coating the liquid dispersion onto an object and evaporating by heating, the concentration of the clay is adjusted to 4 to 7 percent by weight, the preliminarily degassed liquid dispersion is coated onto a flat metal sheet to a thickness of 2 mm, and then dried in a forced air oven under temperature conditions of 30 to 100° C. and preferably 30 to 80° C. for about 10 minutes to 2 hours and preferably for 20 minutes to 1 hour to obtain a clay film.

In the case of not subjecting the liquid dispersion to preliminary degassing treatment, there is the problem of increased susceptibility to the formation of holes attributable to air bubbles in the clay thin film. In addition, the drying conditions are set so as to be adequate for removing the liquid component by drying. At this time, if the drying rate is excessively slow, there is the problem of considerable time being required for drying. In addition, if the drying rate is excessively fast, counterflow occurs in the liquid dispersion resulting in the problem of decreased homogeneity of the clay film. A clay film having an arbitrary thickness can be obtained for the thickness of the present clay film by adjusting the solid content used in the liquid dispersion.

In the case of using the clay film as a self-supporting film, a clay self-supporting film is obtained by peeling the clay film from the container or object surface. In the case the clay thin film does not spontaneously peel from the container or other support, a self-supporting film is preferably obtained by promoting peeling by drawing a vacuum. In addition, as another peeling method, a self-supporting film is preferably obtained by facilitating peeling by drying the clay thin film under temperature conditions of about 110 to 200° C. At this time, in the case the temperature is excessively low, there is the problem of peeling not occurring easily. In the case the temperature is excessively high, there is the problem of deterioration of additives.

In the present invention, a chemical reaction such as an addition reaction, condensation reaction or polymerization reaction is carried out by any means such as heating or irradiation with light to form novel chemical bonds in or between components of clay, an additive and a reinforcing material capable of improving the gas impermeability or mechanical strength of the base material in the form of a clay film. More specifically, by heat treating a clay film to which has been added, for example, a monomer in the form of epsilon-caprolactam that polymerizes by heating at 250° C. in an oven at 250° C. for a predetermined amount of time following film deposition, the epsilon-caprolactam dispersed in the clay film polymerizes to form a polymer and enable the formation of a more rigid molecular network structure. In addition, by irradiating a clay film to which has been added a monomer polymerized by ultraviolet light with ultraviolet light following film deposition, the monomer dispersed in the clay film polymerizes to form a polymer enabling the formation of a more rigid molecular network structure. Moreover, mechanical strength can be improved by heat treating in a non-polar solvent. More specifically, by heat treating at 150° C. in mineral oil for a predetermined amount of time, novel chemical bonds are formed in and between the clay, additive and reinforcing material components, thereby making it possible to improve mechanical strength. A clay film treated in this manner is widely used as a base material.

The clay film itself that composes the surface-treated clay film of the present invention uses clay as the main raw material thereof, and an example of the basic composition thereof preferably consists of 90% by weight or more of a natural or synthetic swelling clay having a layer thickness of about 1 nm, particle diameter of about 1 μm and aspect ratio of about 300, and 10% by weight or less of a natural or synthetic, low molecular weight or high molecular weight additive having a molecular size of several nm or less. This clay film is produced so that, for example, layered crystals having a thickness of about 1 nm are oriented in the same direction and layered to as to be densely laminated. The resulting clay film has a film thickness of 3 to 100 μm, gas impermeability performance is such that the permeability coefficient with respect to oxygen and hydrogen is less than $1 \times 10^{-12}$ $cm^2 s^{-1}$ $cmHg^{-1}$, the surface area can be increased to 100×40 cm or more, the clay film has high heat resistance and there are no decreases observed in gas impermeability even following heat treatment for 24 hours at 600° C.

A clay film or clay self-supporting film obtained in the manner described above is basically hydrophilic. Consequently, it has inferior moisture resistance as compared with a plastic film or metal foil. It therefore has the problem of swelling and becoming brittle under conditions in which there is condensation of moisture or when contacted with water. In addition, it is also difficult to give the clay film or clay self-supporting film a high degree of moisture blocking properties. Here, the clay film can be changed from hydrophilic to hydrophobic by treating the surface thereof making it possible to impart moisture resistance and a high degree of moisture blocking. There are no particular limitations on the surface treatment provided it makes the clay film or clay self-supporting film hydrophobic, and an example is the production of a coating layer.

Examples of methods using the production of a coating layer include methods for forming a fluorine-based film, silicon-based film, polysiloxane film, fluorine-containing organopolysiloxane film, acrylic resin film, vinyl chloride resin film, polyurethane resin film, highly water repellent plating film, metal vapor deposition film or carbon vapor deposition film on a surface. In this case, examples of film production methods include wet methods, dry methods, deposition methods and spraying methods. Since the coating layer produced on the surface is hydrophobic, water repellency is realized on the surface of the clay film. This treatment can be carried out on one side or both sides of the clay film according to the application. Other examples of surface treatment methods include surface modification methods using chemical treatment such as silylation or ion exchange.

As a result of this surface treatment, in addition to the imparting of water repellency and waterproofing as previously described, together with demonstrating reinforcing effects that enhance film strength as well as creating an attractive appearance by imparting gloss as a result of suppressing light scattering on the surface, surface flattening effects that enhance transparency can also be expected. On the other hand, in the case of using an organic polymer for the coating layer, there are cases in which the normal temperature range of the clay film is defined by the normal temperature range of the material of the coating layer. Consequently, the material used for surface treatment and film thickness are carefully selected according to the application.

The clay self-supporting film of the present invention can be easily cut out to an arbitrary size or shape such as a circle, square or rectangle with a scissors, cutter and the like. The clay self-supporting film of the present invention preferably has a thickness of less than 1 mm and a surface area larger than 1 $cm^2$. In addition, the clay film of the present invention is characterized by having mechanical strength enabling use as a self-supporting film, having high elasticity, having high heat resistance, being an electrical insulator, and having low thermal conductivity.

In the case of producing a clay film having high heat resistance, it is important to reduce the added amount of additive having inferior heat resistance in comparison with the clay. In this case, the weight ratio of the additive based on the total solid content is preferably 10% or less. This does not apply in cases in which heat resistance is not particularly required. Since the clay film of the present invention has clay for the main component thereon it has superior insulating properties and can be used over a wide range as a heat-resistant, insulating film. In addition, since the clay film of the present invention has superior heat insulating properties, it can also be used over a wide range as a heat insulating film.

The following provides an explanation of the characteristic values of the material (base material) of the present invention.

(1) Density

The density of conventional materials is at most 1.51 in plastic-filler nanocomposite products as indicated in the table below. In contrast, the material of the present invention has a density in excess of 1.51, and demonstrates measured values for density of 2.0 or more, and for example, about 2.10. In this manner, the material of the present invention has a density in excess of 1.51, and in particulars has a density of about 1.60 to 2.50.

TABLE 1

| Host Plastic | Guest Filler | Filler Concentration | Density | Cited Reference |
| --- | --- | --- | --- | --- |
| Polylactic acid | Clay | | 1.27 | 1) |
| Nylon | Clay | | 1.15 | 2) |
| Polyamide | Clay | | 1.15 | 3) |
| Polyamide | Glass fiber | 30% | 1.36 | 3) |
| Polyamide | Clay | | 1.51 | 4) |

(Cited References: Noboru Chujyo, edit Development of Polymer-based Nanocomposite Products, Frontier Publishing, p. 191[1)], p. 186[2)], p. 189[3)], p. 192[4)], 2004)

(2) Flexibility

The most flexible material among conventional materials is a commercially available sheet made of clay and pulp fiber, and the bending resistance thereof is 8.0 (mN) as the value measured in compliance with Method A of JIS L 1096: 1999 "General Testing for Woven Fabrics" obtained in a bending resistance test. On the other hand, the hardest clay film is HR50/5-80 H, and the bending resistance of the top surface is 5.3 (mN) and that of the bottom surface is 17.1 (mN). In contrast, the value obtained in a bending resistance test for the material of the present invention is about 2.0 mN, and the material of the present invention at least has a value that is less than 8.0 mN. Since the threshold of bending resistance of conventional materials and the material of the present invention can be said to be 8.0 mN, this value can be used to distinguish (discriminate) between the material of the present invention and conventional materials.

(3) Characteristics of Raw Material Clay

In the present invention, the raw material clay preferably has, for example, a primary particle aspect ratio (based on the number of particles) of about 320, and a raw material clay having high methylene blue adsorption and high cation exchange capacity is used in particular. A specific example of such a raw material clay has characteristics consisting of an amount of methylene blue adsorption of 130 mmol/100 g, a cation exchange capacity of 110 meq/100 g, a pH of a 2% aqueous dispersion of 10.2, a viscosity of a 4% aqueous dispersion of 350 mPa·s, and an aqueous dispersion median diameter of 1.13 μm. However, the raw material clay is not limited to these characteristics, and a raw material clay having similar or equivalent properties thereto can be similarly used by using these characteristics as standard values. Tsukinono clay found in Yamagata Prefecture, Japan and materials having this as a main component thereof are preferably used for these raw material clays.

(4) Other Characteristics

The material of the present does not exhibit abnormalities in a heat cycling Lest (100 to 600°, 30 cycles) (high heat resistance), has electrical resistance such that the volumetric resistivity (500 V) is $2.3 \times 10^7$ Ωm (JIS K 6911: 1995) (high insulating properties) and is used, for example, as a flexible substrate material. Other characteristics of the material of the present invention are indicated with the following characteristic values. The permeability coefficient with respect to oxygen and hydrogen is less than $1 \times 10^{-12}$ $cm^2 s^{-1}$ $cmHg^{-1}$ rupture elongation is 2.2%, tensile strength (JIS K 6252: 2001) is 33.4 N/mm, oxygen index (JIS K 7201: 1995) is greater than 94.0, specific heat is 1.19 J/g·K, thermal diffusivity is $1.12 \times 10^{-7}$ $m^2/s$, thermal conductivity is 0.27 W/m·K, coefficient of thermal expansion (−1.00 to 100° C.) is $0.1 \times 10^{-4}$ $K^{-1}$, coefficient of thermal expansion (100 to 200° C.) is $-0.06 \times 10^{-4}$ $K^{-1}$, and there are no abnormalities demonstrated in a corrosive gas resistance test. These values indicate preferable characteristic values of the material of the present invention, and the present invention is not limited thereto, but rather materials having characteristic values similar or equivalent thereto based on using these values as standard values are included in the scope of the present invention.

Next, the present invention is able to provide a clay film composed of clay serving as the main component, clay and a small amount of additive, or clay, a small amount of additive and a small amount of reinforcing material, having a structure in which layers of clay particles are highly oriented, having mechanical strength and flexibility enabling use as a self-supporting film, and having a permeability coefficient with respect to air, oxygen gas, nitrogen gas, hydrogen gas or helium gas at room temperature of less than $1 \times 10^{-12}$ $cm^2 s^{-1}$ $cmHg^-$.

In this clay film, the weight ratio of the additive to the total solid content is preferably 30 percent or less, and the weight ratio of the reinforcing material to the total solid content is preferably 30 percent or less. The clay film of the present invention is used as a self-supporting film peeled from a container or object surface, or by being supported on a container or an object surface. This clay film is characterized by being a self-supporting film, having flexibility, being easily processed, being easily made to be functional, having a thickness of about 3 to 100 μm, and being highly oriented on the micrometer or nanometer level. This clay film is also characterized by having tensile strength of 30 MPa or more as determined according to JIS K 7127. With respect to the basic performance of this clay film, gas impermeability is such that permeability is below the measurement limit in the case of helium (equivalent to aluminum foil), heat resistance is such that gas impermeability does not decrease after treating for 24 hours at 600° C., and tensile strength is equivalent to that of polypropylene. Moisture blocking is such that the coefficient of water permeability is $2 \times 10^{-10}$ cm/sec or less. In this clay film, high gas impermeability is obtained by increasing the proportion of the clay serving as the main component in particular.

The clay film itself of the present invention uses clay as the main raw material, and an example of the basic composition thereof preferably consists of 90% by weight or more of a natural or synthetic swelling clay having a layer thickness of about 1 nm, particle diameter of up to 1 μm and aspect ratio of up to about 300, and 10% by weight or less of a natural or synthetic, low molecular weight or high molecular weight additive having a molecular size of several nm or less. This clay film is produced so that, for example, layered crystals having a thickness of about 1 nm are oriented in the same direction and layered to as to be densely laminated. The resulting clay film has a film thickness of 3 to 100 μm, gas impermeability performance is such that the permeability coefficient with respect to oxygen and hydrogen is less than $1\times10^{-12}$ cm$^2$s$^{-1}$ cmHg$^{-1}$, the coefficient of water permeability is $2\times10^{-10}$ cm/sec, the surface area can be increased to 100×40 cm or more, the clay film has high heat resistance and there are no decreases observed in gas impermeability even following heat treatment for 24 hours at 600° C.

In the clay film production process of the present invention, a weighed reinforcing material is added to a clay liquid dispersion to prepare a homogeneous liquid dispersion. One or more types of mineral fibers, glass wool, carbon fibers, ceramic fibers, plant fibers or organic polymer fiber resin can be used for the reinforcing material. Examples of ceramic fibers include alumina, zirconia, silicon carbide, silicon nitride and boron nitride. Examples of organic polymer fibers include polyester, polyamide, polyimide, polyurethane, polyacrylic acid, polyvinyl alcohol, polyether, ethylene-vinyl alcohol copolymer, acrylic acid copolymer polymers, and polysaccharides.

Next, in the present invention, the present invention is able to provide a multilayer film composed of fabric and clay that has flexibility, is able to be used as a self-supporting film, has gas impermeability, and has a permeability coefficient with respect to air, oxygen gas, nitrogen gas, hydrogen gas or helium gas at room temperature of less than $1\times10^{-12}$ cm$^2$ s$^{-1}$ cmHg$^{-1}$. This multilayer film has a permeability coefficient with respect to air, oxygen gas, nitrogen gas, hydrogen gas or helium gas of less than $1\times10^{-12}$ cm$^2$s$^{-1}$ cmHg$^{-1}$ following heat treatment in an ordinary air atmosphere for 24 hours at 600°, and has a weight loss of 5% or less from 200 to 600° C. as determined by differential thermal analysis in an ordinary air atmosphere.

The multilayer film of the present invention has a clay layer present on one side of both sides of the fabric, a fabric present on both sides of the clay layer, or contains a structure thereof. The multilayer film of the present invention is composed of clay only, clay and a small amount of an additive, or clay, a small amount of an additive and a small amount of a reinforcing material. The main component of the clay layer is natural or synthetic clay.

In the present invention, a multilayer film having improved moisture resistance, gas impermeability or mechanical strength by causing a chemical reaction such as an addition reaction, condensation reaction or polymerization reaction by an arbitrary method or means such as heating or irradiation with light to form novel chemical bonds in or between components of clay, is also targeted.

In the present invention, surface treatment may be carried out for the purpose of water repellency, waterproofing, reinforcing or surface flattening, and this surface treatment is able to form a fluorine-based film, silicon-based film, polysiloxane film, fluorine-containing organopolysiloxane film, acrylic, resin film, vinyl chloride resin film, polyurethane resin film, highly water repellent plating film, metal vapor deposition film or carbon vapor deposition film on a surface. The weight ratio of the above-mentioned additive to the total solid content is preferably 30 percent or less. The weight ratio of the above-mentioned reinforcing material to the total solid content is preferably 30 percent or less. The multilayer film of the present invention is used as a self-supporting film that is peeled from a container or object surface, or by being supported on a container or object surface.

This multilayer film is characterized by being a self-supporting film, having flexibility, being easily processed, being easily made to be functional, having a thickness of about 3 to 100 μm, and being highly oriented on the micrometer or nanometer level. This multilayer film is also characterized by having tensile strength of 10 MPa or more as determined according to JIS K 7127. With respect to the basic performance of this multilayer film, gas impermeability is such that permeability is below the measurement limit in the case of helium (equivalent to aluminum foil), heat resistance is such that gas impermeability does not decrease after treating for 24 hours at 600° C., and tensile strength is 10 MPa or more. In this multilayer film, high heat resistance is obtained by increasing the proportion of the clay serving as the main component in particular.

The multilayer film itself of the present invention uses clay as the main raw material, and an example of the basic composition thereof preferably consists of 90% by weight or more of a natural or synthetic swelling slay having a layer thickness of about 1 nm, particle diameter of about 1 μm and aspect ratio of about 300, and 10% by weight or less of a natural or synthetic, low molecular weight or high molecular weight additive having a molecular size of several nm or less. This multilayer film is produced so that, for example, layered crystals having a thickness of about 1 nm are oriented in the same direction and layered to as to be densely laminated The resulting multilayer film has a film thickness of 3 to 100 μm, gas impermeability performance is such that the permeability coefficient with respect to oxygen and hydrogen is less than $1\times10^{-12}$ cm$^2$s$^{-1}$ cmHg$^{-1}$, the surface area can be increased to 3.00×40 cm or more, the multilayer film has high heat resistance and there are no decreases observed in gas impermeability even following heat treatment for 24 hours at 600° C.

The present invention is also characterized by being a multilayer film composed of a fabric and clay, having flexibility, being able to be used as a self-supporting film, having heat resistance and having gas impermeability, and is in the form of a self-supporting film or supported film in which a clay layer is present on one side of both sides of the fabric, a fabric is present on both sides of the clay layer, or contains a structure thereof.

Next, an explanation is provided of the production process of the multilayer film of the present invention. In the present invention, a natural or synthetic clay, and preferably a natural smectite or synthetic smectite or mixture thereof, is used for the clay, and this is added to water or a liquid consisting mainly of water to prepare a dilute, homogeneous liquid dispersion. One or more types selected from the group consisting mica, vermiculite, montmorillonite, iron montmorillonite, beidellite, saponite, hectorite, stevensite and nontronite can be used for the clay. The concentration of the clay liquid dispersion is preferably 0.5 to 15 percent by weight and more preferably 1 to 10 percent by weight. At this time, if the concentration of the clay liquid dispersion is excessively low, there is the problem of excessive time required for drying. In addition, if the concentration of clay liquid dispersion is excessively high, since the clay is not adequately dispersed, the orientation of the clay particles is poor thereby resulting in the problem of it being difficult to form a uniform film.

Next, a weighed solid or liquid additive is added to the clay liquid dispersion as necessary to prepare a homogeneous liquid dispersion. There are no particular limitations on the additive provided it improves the flexibility or mechanical strength of the multilayer film and uniformly mixes with the clay, examples of which can be used include one or more types of ethylene glycol, glycerin, epsilon-caprolactam, dextrin, starch, cellulose-based resin, gelatin, agar, flour, gluten, alkyd resin, polyurethane resin, epoxy resin, fluororesin, acrylic resin, methacrylic resin, phenolic resin, polyamide resin, polyester resin, polyamide resin, polyvinyl resin, polyethylene glycol, polyacrylamide, polyethylene oxide, protein, deoxyribonucleic acid, ribonucleic acid, polyamino acid, phenols, benzoic acid compounds and silicon resin. The weight ratio of additive to the total solid content is 30 percent or less and preferably 1 to 10 percent. At this time, if the ratio of the additive is excessively low, the effect of addition is not demonstrated, while if the ratio of the additive is excessively high, the distribution of the additive and clay in the prepared film becomes heterogeneous, and as a result, the homogeneity of the resulting multilayer film decreases, and the effect of addition is diminished. In addition, the heat resistance of the multilayer film decreases in the case the ratio of the additive is excessively high.

Next, a weighed reinforcing material is added to the clay liquid dispersion to prepare a homogeneous liquid dispersion. One or more types of mineral fibers, glass wool, carbon fibers, ceramic fibers, plant fibers or organic polymer fiber resin can be used for the reinforcing material. The weight ratio of the reinforcing material to the total solid content is 30 percent or less and preferably 1 to 10 percent. At this time, in the case the ratio of the reinforcing material is excessively low, the effects of addition are not demonstrated, while if the ratio of the reinforcing material is excessively high, the distribution of the reinforcing material and clay in the prepared film becomes heterogeneous, and as a result, the homogeneity of the resulting multilayer film decreases and the effect of addition is diminished. Furthermore, the order in which the reinforcing material and additive are added is not predetermined, and may be added in either order.

Next, after having poured this liquid dispersion into a container on which a fabric has been laid or coated onto the surface of support spread out so as to contact a fabric, the liquid of the liquid dispersion is removed by drying to produce a multilayer film composed of fabric and clay. At this time, examples of the fabric include organic polymer fibers, silica fibers, alumina fibers, glass fibers, ceramic fibers, intermediate compositions thereof or compound fibers comprised of two or more types thereof. An inorganic material is preferably used for the material of the fabric in cases of requiring heat resistance of 300° C. or higher. However, a fabric using a heat-resistant organic polymer such as aramid fibers, fluororesin, amide resin or imide resin can be used according to the conditions of use in cases in which heat resistance up to about 300° C. is sufficient. In addition, paper made from organic polymer fibers is also included in the scope of the fabric referred to here. In the present invention, a fabric refers to that which contains these fibers or a material equivalent or similar thereto. At this time, in the case of using the fabric as a supporting film, the dispersion may be poured or coated after fixing the fabric on an object by adhesion or melting and the like. A dispersion layer is formed so as to prevent the entrance of air bubbles into the fabric and clay film, and a dense multilayer film is obtained by allowing microcrystals of the clay to enter into the openings in the fabric.

An example of a method for producing a multilayer film consists of slowly evaporating the dispersion in the form of a liquid to form a film. The dispersion is then coated onto the surface of a support followed by removing the dispersion medium in the form of a liquid by drying. Examples of methods for removing the dispersion medium in the form of a liquid by drying include various solid-liquid separation methods such as centrifugal separation, filtration, vacuum drying, freeze-vacuum drying, heated evaporation or a combination thereof. Among these methods, in the case of, for example, pouring the dispersion into a container and using heated evaporation, a fabric is laid on a support such as a flat tray and preferably a plastic or metal tray, the concentration of the clay is adjusted to 0.5 to 3 percent by weight, a dispersion that has been degassed in advance is poured onto the fabric from above, and the fabric is dried while being kept level in a forced air oven under temperature conditions of 30 to 70° and preferably 30 to 50° C. for 3 hours to about a half day and preferably for 3 hours to 5 hours to obtain a two-layer multilayer film.

In additions as another example, in the case of coating a gel-like dispersion having a comparatively high solid-liquid ratio onto an object and using heated evaporation, a fabric is laid on a flat metal plate, the concentration of the clay is adjusted to 4 to 7 percent by weight, a dispersion that has been degassed in advance is coated onto the fabric to a thickness of 2 mm and then dried in a forced air oven under temperature conditions of 30 to 100° C. and preferably 30 to 80° C. for about 10 minutes to 2 hours and preferably for 20 minutes to 1 hour to obtain a two-layer multilayer film. The clay layer is formed on the top of the fabric in these cases.

A multilayer film comprised of three layers in which a clay layer is formed on both sides of a fabric can be obtained by turning over a two-layer multilayer film and carrying out the treatment described above to form a clay layer. In addition, a multilayer film comprised of three layers in which a clay layer is sandwiched between fabrics can be obtained by mutually laminating before the clay layer has completely dried during the course of producing a two-layer multilayer film. Furthermore, by repeating these procedures, a multilayer that comprises three or more layers can be produced. An adhesive can be used in the case of producing a multilayer film comprised of three layers or more.

In the case of not degassing the dispersion in advance, a problem may occur in which holes caused by air bubbles form easily in the clay layer. In addition, drying conditions are set so that the liquid component is adequately removed by drying. At this time, if the drying rate is too slow, there is the problem of excessive time being required for drying. In addition, if the drying rate is too fast, counterflow of the dispersion occurs, resulting in the problem of decreased homogeneity of the multilayer film. The clay layer is such that a film of arbitrary thickness can be obtained by adjusting the amount of solid used in the dispersion.

In the case of using a multilayer film as a self-supporting film, a clay self-supporting film is obtained by peeling the multilayer film from a container or object surface. In the case the clay thin film does not spontaneously peel from the container or other support, a self-supporting film is preferably obtained by promoting peeling by drawing a vacuum. In addition, as another peeling method, a self-supporting film is preferably obtained by facilitating peeling by drying the clay thin film under temperature conditions of about 110 to 200° C. At this time, in the case the temperature is excessively low, there is the problem of peeling not occurring easily. In the case the temperature is excessively high, there is the problem of deterioration of additives. In the case of not containing additives, peeling can be promoted by treatment at a higher temperature. Temperature conditions up to 700° C. can be used for the high-temperature treatment at this time. In addition, another example of a method for peeling the film consists of applying a solvent such as alcohol to facilitate peeling.

A clay film or clay self-supporting film obtained in the manner described above is basically hydrophilic. Consequently, it has inferior moisture resistance as compared with a plastic film or metal foil. It therefore has the problem of swelling and becoming brittle under conditions in which there is condensation of moisture or when contacted with water. In addition, it is also difficult to give the clay film or clay self-supporting film a high degree of moisture blocking properties. Here, the clay film can be changed from hydrophilic to hydrophobic by treating the surface thereof making it possible to impart moisture resistance and a high degree of moisture blocking. There are no particular limitations on the surface treatment provided it makes the clay firm or clay self-supporting film hydrophobic, and an example is the production of a coating layer.

Examples of methods using the production of a coating layer include methods for forming a fluorine-based film, silicon-based film, polysiloxane film, fluorine-containing organopolysiloxane film, acrylic resin film, vinyl chloride resin film, polyurethane resin film, highly water repellent plating film, metal vapor deposition film or carbon vapor deposition film on a surface. In this case, examples of film production methods include wet methods, dry methods, deposition methods and spraying methods. Since the coating layer produced on the surface is hydrophobic, water repellency is realized on the surface of the clay film. This treatment can be carried out on one side or both sides of the clay film according to the application. Other examples of surface treatment methods include surface modification methods using chemical treatment such as silylation or ion exchange.

As a result of this surface treatment, in addition to the imparting of water repellency and waterproofing as previously described, reinforcing effects that enhance film strength as well effects that create an attractive appearance by imparting gloss as a result of suppressing light scattering on the surface can be expected. On the other hand, in the case of using an organic polymer for the coating layer, there are cases in which the normal temperature range of the clay film is defined by the normal temperature range of the material of the coating layer. Consequently, the material used for surface treatment and film thickness are carefully selected according to the application.

In the case of producing a multilayer film having high heat resistance, it is important to reduce the added amount of additive having inferior heat resistance in comparison with the clay. In this case, the weight ratio of the additive based on the total solid content is preferably 10% or less. This does not apply in cases in which heat resistance is not particularly required. Since the multilayer film of the present invention has clay for the main component thereof, it has superior insulating properties and can be used over a wide range as a heat-resistant, insulating film. In addition, since the multilayer film of the present invention has superior heat insulating properties, it can also be used over a wide range as a heat insulating film.

Next, the present invention is able to provide an adhesive clay film in which an adhesive layer is present on a clay film, wherein the adhesive clay film is maintaly composed of clay, has flexibility, can be used as a self-supporting film, and has gas impermeability. The permeability coefficient of this adhesive clay film with respect to air, oxygen gas, nitrogen gas, hydrogen gas or helium gas at room temperature is less than $10 \times 10^{-12}$ cm$^2$s$^{-1}$ cmHg$^{-1}$.

The adhesive clay film of the present invention has an adhesive layer on one side or both sides of the clay film. The clay layer of the adhesive clay film of the present invention is composed of clay only, clay and a small amount of additive or clay, a small amount of additive and a small amount of reinforcing material. The main component of the clay layer is natural clay or synthetic clay. Examples of the main component of the clay film include mica, vermiculite, montmorillonite, iron montmorillonite, beidellite, saponite, hectorite, stevensite and nontronite.

Examples of the additive in this adhesive clay film include ethylene glycol, glycerin, epsilon-caprolactam, dextrin, starch, cellulose-based resin, gelatin, agar, flour, gluten, alkyd resin, polyurethane resin, epoxy resin, fluororesin, acrylic resin, methacrylic resin, phenolic resin, polyamide resin, polyester resin, polyimide resin, polyvinyl resin, polyethylene glycol, polyacrylamide, polyethylene oxide, protein, deoxyribonucleic acid, ribonucleic acid, polyamino acid, phenols, benzoic acid compounds and silicon resin.

Examples of the reinforcing material include one or more types of mineral fibers, glass wool, carbon fibers, ceramic fibers, plant fibers and organic polymer fibers. In addition, examples of the adhesive layer include adhesives and adhesive layers composed of an adhesive and base layer. In the present invention, an adhesive clay film having improved moisture resistance, gas impermeability or mechanical strength by causing a chemical reaction such as an addition reaction, condensation reaction or polymerization reaction by an arbitrary method or means such as heating or irradiation with light to form novel chemical bonds in or between components of clay, is also targeted.

In the present invention, surface treatment may be carried out for the purpose of, for example, water repellency, waterproofing, reinforcing or surface flattening, and this surface treatment is able to form a fluorine-based film, silicon-based film, polysiloxane film, fluorine-containing organopolysiloxane film, acrylic resin film, vinyl chloride resin film, polyurethane resin film, highly water repellent plating film, metal vapor deposition film or carbon vapor deposition film on a surface. The weight ratio of the above-mentioned additive to the total solid content is preferably 30 percent or less, and the weight ratio of the above-mentioned reinforcing material to the total solid content is preferably 30 percent or less.

This adhesive clay film is characterized by being a self-supporting film, having flexibility, being easily processed, being easily made to be functional, having a thickness of the clay layer of about 3 to 100 μm, and being highly oriented on the micrometer or nanometer level. This adhesive clay film is also characterized by having tensile strength of 10 MPa or more as determined according to JIS K 7127. With respect to the basic performance of this adhesive clay film, gas impermeability is such that permeability is below the measurement limit in the case of helium (equivalent to aluminum foil) while tensile strength is 10 MPa or more. In this adhesive clay film, high heat resistance is obtained by increasing the ratio of the main component clay and selecting a material having high heat resistance for the adhesive layer in particular.

The clay layer that composes the adhesive clay film of the present invention uses clay as the main raw material, and an example of the basic composition thereof preferably consists of 90% by weight or more of a natural or synthetic swelling clay having a layer thickness of about 1 nm, particle diameter of about 1 μm and aspect ratio of about 300, and 10% by weight or less of a natural or synthetic, low molecular weight or high molecular weight additive having a molecular size of several nm or less. This adhesive clay film is produced so that, for example, layered crystals having a thickness of about 1 nm are oriented in the same direction and layered to as to be densely laminated. The resulting adhesive clay film has a film thickness of the clay layer of 3 to 100 μm, gas impermeability performance is such that the permeability coefficient with respect to oxygen and hydrogen is less than $1 \times 10^{-12}$ cm$^2$s$^{-1}$ cmHg$^{-1}$, the surface area can be increased to 100×40 cm or more, and direct current electrical resistance in the perpendicular direction to the film is 1 megaohm or more.

The present invention easily provides an adhesive clay film able to be adhered and laminated either with itself or another material, and provides a laminated clay film having mechanical strength and toughness enabling use as a self-supporting film while also having superior gas impermeability, electrical insulating properties and flexibility. In addition, the present invention provides a film, sheet, pipe, container or other member having any of gas impermeability, water vapor impermeability and electrical insulating properties by adhering the present adhesive clay film. In addition, the present invention provides a method for imparting any of gas impermeability, water vapor impermeability and electrical insulating properties to a film, sheet, pipe, container or other member by adhering the present adhesive clay film.

An example of a method for producing the clay layer consists of slowly evaporating the liquid of the liquid dispersion to form a film. The dispersion is coated on the surface of a support followed by removing the liquid serving as the dispersion medium by drying. Examples of such methods for removing the liquid serving as the dispersion medium by drying include various solid-liquid separation methods such as centrifugal separation, filtration, vacuum drying, freeze-vacuum drying and heated evaporation or a combination thereof. Among these methods, in the case of, for example, using a method consisting of pouring the liquid dispersion into a container and evaporating by heating, a flat tray, and preferably a plastic or metal tray, is placed horizontally, the concentration of the clay is adjusted to 0.5 to 3 percent by weight, a preliminarily degassed liquid dispersion is poured into the tray, and the liquid dispersion is dried while maintaining in a level state in a forced air oven under temperature conditions of 30 to 70° and preferably 30 to 50° C. for about 3 hours to half a day and preferably for 3 to 5 hours to obtain a clay thin film. In addition, as another example, in the case of coating a gel-like dispersion having a comparatively high solid-liquid ratio onto an object serving as a support and using heated evaporation, the concentration of the clay is adjusted to 4 to 7 percent by weight, a dispersion that has been degassed in advance is coated onto an object such as a metal plate to a thickness of 2 mm and then dried in a forced air oven under temperature conditions of 30 to 100° C. and preferably 30 to 80° C. for about 10 minutes to 2 hours and preferably for 20 minutes to 1 hour to obtain a clay layer.

In the case of not degassing the dispersion in advance, a problem may occur in which holes caused by air bubbles form easily in the clay layer. In addition, drying conditions are set so that the liquid component is adequately removed by drying. At this time, if the drying rate is too slow, there is the problem of excessive time being required for drying. In addition, if the drying rate is too fast, counterflow of the dispersion occurs, resulting in the problem of decreased homogeneity of the clay layer. The clay layer is such that a film of arbitrary thickness can be prepared by adjusting the amount of solid used in the dispersion.

Next, the clay layer is peeled from the surface of the object or container. In the case the clay layer does not spontaneously peel from the container or other support, peeling is preferably promoted by drawing a vacuum. In addition, as another peeling method, a self-supporting film is preferably obtained by facilitating peeling by drying under temperature conditions of about 110 to 200° C. to facilitate peeling. At this time, in the case the temperature is excessively low, there is the problem of peeling not occurring easily. In the case the temperature is excessively high, there is the problem of deterioration of additives. In the case of not containing additives, peeling can be promoted by treatment at a higher temperature. Temperature conditions up to 700° C. can be used for the high-temperature treatment at this time. In addition, another example of a method for peeling the film consists of applying a solvent such as alcohol to facilitate peeling.

A clay layer obtained in the manner described above is basically hydrophilic. Consequently, it has inferior moisture resistance as compared with a plastic film or metal foil. It therefore has the problem of swelling and becoming brittle under conditions in which there is condensation of moisture or when contacted with water. In addition, it is also difficult to give the clay layer a high degree of moisture blocking properties. Here, the clay layer can be changed from hydrophilic to hydrophobic by treating the surface thereof making it possible to impart moisture resistance and a high degree of moisture blocking. There are no particular limitations on the surface treatment provided it makes the surface of the clay layer hydrophobic, and an example is the production of a coating layer. Examples of methods using the production of a coating layer include methods for forming a fluorine-based film, silicon-based film, polysiloxane film, fluorine-containing organopolysiloxane film, acrylic resin film, vinyl chloride resin film, polyurethane resin film, highly water repellent plating film, metal vapor deposition film or carbon vapor deposition film on a surface. In this case, examples of film production methods include wet methods, dry methods, deposition methods and spraying methods. Since the coating layer produced on the surface is hydrophobic, water repellency is realized on the surface of the clay film. This treatment is carried out on the side on which the adhesive layer is not formed. Other examples of surface treatment methods include surface modification methods using chemical treatment such as silylation or ion exchange.

As a result of this surface treatment, in addition to the imparting of water repellency and waterproofing as previously described, reinforcing effects that enhance film strength as well effects that create an attractive appearance by imparting gloss as a result of suppressing light scattering on the surface can be expected. On the other hand, in the case of using an organic polymer for the coating layer, there are cases in which the normal temperature range of the clay film is defined by the normal temperature range of the material of the coating layer. Consequently, the material used for surface treatment and film thickness are carefully selected according to the application.

Next, the adhesive layer is formed on at least one side of the clay layer. The clay layer is cleaned as necessary before forming the adhesive layer. In addition, a primer is applied between the clay layer and the adhesive layer as necessary. The purpose of applying a primer is to improve affinity between the clay layer and the adhesive layer, reinforce the surface of the adhered object, protect the adhesion interface and so on, and examples of the primer include ethylene-vinyl acetate resin-based adhesives. Since the clay layer has high gas impermeability causing the adhesive to dry slowly, the use of a solvent-free adhesive is recommended. Examples of methods for forming the adhesive layer on the clay layer include coating, spraying and dip coating. Examples of adhesives include natural adhesives, inorganic adhesives, thermoplastic adhesives, thermocurable adhesives, rubber-based adhesives, cyanoacrylate-based adhesives and heat-resistant adhesives. In addition, there are also methods in which the adhesive layer is in the form of a film, and is coated onto the clay layer by hot pressing. Moreover, a double-sided adhesive sheet can also be used in which these adhesive layers are coated onto both sides of a base material. An adhesive layer can be formed on one side of a clay layer by peeling a release sheet on one side of a double-sided adhesive sheet and adhering to the clay layer.

In addition, in the case of using a double-sided adhesive sheet having a base material, the effect is realized of allowing the base material to fulfill the role of reinforcing the clay layer. At this time, the base material may be a an organic polymer film or a nonwoven fabric. It is necessary to increase the heat-resistance of the adhesive layer to increase the heat resistance of the adhesive clay film. In order to do this, heat resistance can be secured such as by using an acrylic material for the base. In addition, heat resistance can also be secured by employing a method consisting of temporarily adhering a thermocurable adhesive layer by heat lamination followed by coating with an adhesive layer of the type that is finally cured by oven curing.

It is difficult to increase the thickness of the clay layer. This is because, due to the high gas impermeability of the clay layer, it is difficult to remove the solvent by drying in the case of a thick layer. A thick clay film can be easily, uniformly and reliably produced by laminating this adhesive clay film. As a result, a packing requiring thickness, an electrical insulating film requiring high electrical insulating properties, and a gas impermeable film requiring high gas impermeability can be easily provided.

Next, an explanation is provided of characteristic values of the material (base material) of the present invention.

(1) Density

The density of conventional materials is at most 1.51 in plastic-filler nanocomposite products as indicated in the table below. In contrast, the material of the present invention has a density in excess of 1.51, and demonstrates measured values for density of 2.0 or more, and for example, about 2.10. In this manner, the material of the present invention has a density in excess of 1.51, and in particular, has a density of about 1.60 to 2.50.

TABLE 2

| Host plastic | Guest Filler | Filler Concentration | Density | Cited Reference |
|---|---|---|---|---|
| Polylactic acid | Clay | | 1.27 | 1) |
| Nylon | Clay | | 1.15 | 2) |
| Polyamide | Clay | | 1.15 | 3) |
| Polyamide | Glass fiber | 30% | 1.36 | 3) |
| Polyamide | Clay | | 1.51 | 4) |

(Cited References: Noboru Chujyo, ed., Development of Polymer-based Nanocomposite Products, Frontier Publishing, p, 191[1)], p. 186[2)], p. 189[3)], p. 192[4)], 2004)

(2) Flexibility

The most flexible material among conventional materials is a commercially available sheet made of clay and pulp fiber, and the bending resistance thereof is 8.0 (mN) as the value measured in compliance with Method A of JIS L 1096: 1999 "General Testing for Woven Fabrics" obtained in a bonding resistance test. On the other hand, the hardest clay film is HR50/5-80H, and the bending resistance of the top surface is 5.3 (mN) and that of the bottom surface is 17.1 (mN). In contrast, the value obtained in a bending resistance test for the material of the present invention is about 2.0 Nm, and the material of the present invention at least has a value that is less than 8.0 mN. Since the threshold of bending resistance of conventional materials and the material of the present invention can be said to be 8.0 mN, this value can be used to distinguish (discriminate) between the material of the present invention and conventional materials.

(3) Characteristics of Raw Material Clay

In the present invention, the raw material clay preferably has, for example, a primary particle aspect ratio (based on the number of particles) of about 320, and a raw material clay having high methylene blue adsorption and high cation exchange capacity is used in particular. A specific example of such a raw material clay has characteristics consisting of an amount of methylene blue adsorption of 130 mmol/100 g, a cation exchange capacity of 110 meq/100 g, a pH of a 2% aqueous dispersion of 10.2, a viscosity of a 4% aqueous dispersion of 350 mPa·s, and an aqueous dispersion median diameter of 1.13 μm. However, the raw material clay is not limited to these characteristics, and a raw material clay having similar or equivalent properties thereto can be similarly used by using these characteristics as standard values Tsukinuno clay found in Yamagata Prefecture, Japan and materials having this as a main component thereof are preferably used for these raw material clays.

(4) Other Characteristics

The material of the present does not exhibit abnormalities in a heat cycling test (100 to 600°, 30 cycles) (high heat resistance), has electrical resistance such that the volumetric resistivity (500 V) is $2.3 \times 10^7$ Ωm (JIS K 6911: 1995) (high insulating properties), and is used, for example, as a flexible substrate material. Other characteristics of the material of the present invention are indicated with the following characteristic values. The permeability coefficient with respect to oxygen and hydrogen is less than $1 \times 10^{-12}$ cm$^2$s$^{-1}$ cmHg$^{-1}$, rupture elongation is 2.2%, tensile strength (JIS K 6252: 2001) is 33.4 N/mm, oxygen index (JIS K 7201: 1995) is greater than 94.0, specific heat is 1.19 J/g K, thermal diffusivity is $1.12 \times 10^{-7}$ m$^2$/s, thermal conductivity is 0.27 W/m·K, coefficient of thermal expansion (−100 to 100° C.) is $0.1 \times 10^{-4}$ K$^{-1}$, coefficient of thermal expansion (100 to 200° C.) is $-0.06 \times 10^{-4}$ K$^{-1}$, and there are no abnormalities demonstrated in a corrosive gas resistance test. These values indicate preferable characteristic values of the material of the present invention, and the present invention is not limited thereto, but rather materials having characteristic values similar or equivalent thereto based on using these values as standard values are included in the scope of the present invention.

According to the present invention, effects are demonstrated consisting of (1) being able to provide a clay film, and a production process thereof, having a surface that is water-repellent and hydrophilic, having mechanical strength enabling use as a self-supporting film, and having superior flexibility, gas impermeability, water vapor impermeability and thermal stability; (2) being able to provide a novel technology and novel material having electrical insulating properties and heat insulating properties; (3) being able to provide a novel technology and novel material such as a member able to be used as a packing, solid electrolyte fuel cell membrane, electrical insulator or heat insulator having both heat resistance and flexibility; and (4) the clay film product of the present invention being able to be preferably used as a substitute for asbestos.

BEST MODE FOR CARRYING OUT THE INVENTION

Figure 1:
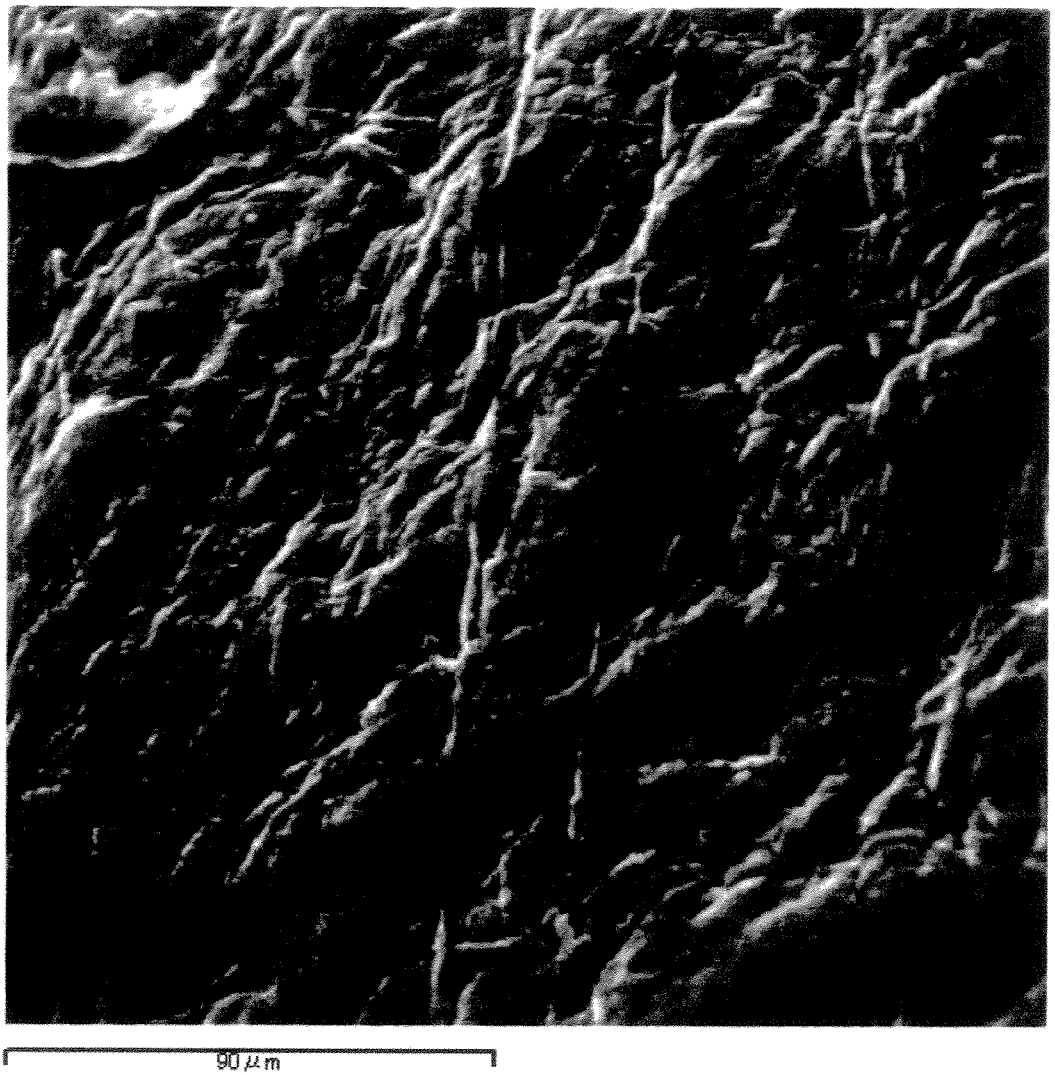
FIG. 1 shows a photograph taken with a scanning electron microscope of the cross-section of a clay film of the present invention (in which the ratios of the contents of epsilon-caprolactam and glass wool used based on the total solid content are 9% and 5%, respectively)

Although the following provides a detailed explanation of the present invention based on examples thereof, the present invention is not limited to these examples.

Example 1

(1) Production of Clay Film 20 cm$^3$ of distilled water were added to 0.95 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. An aqueous solution containing 0.09 g of an additive in the form of epsilon-caprolactam (Wako Pure Chemical Industries, Ltd.) was added to this dispersion to obtain a homogeneous dispersion. The resulting dispersion was coated onto a brass plate having a length of about 30 cm and width of about 20 cm, and dried while maintaining the plate in a level state in a forced air oven under temperature conditions of 60° C. for 1 hour to obtain a homogeneous water-soluble polymer-compounded clay thin film having a thickness of about 60 micrometers. The formed clay thin film was then peeled from the tray to obtain a clay film. Next, an acetone isopropyl alcohol solution of a fluorourethane resin and silicon resin was sprayed onto both sides of the clay film to improve the water repellency and water vapor impermeability of the clay film followed by drying at room temperature to form a coating layer comprising a fluorourethane resin and silicon resin The thickness of the coating layer was about 1 micrometer.

(2) Characteristics of Clay Film

The permeability coefficient of the clay film at room temperature with respect to air, oxygen gas, nitrogen gasp hydrogen gas or helium gas was less than $1\times10^{-12}$ cm$^2$s$^{-1}$ cmHg$^{-1}$. In this manner, a clay film having high tensile strength was obtained by producing a coating layer on both sides thereof. As a result of measuring the water vapor transmission rate of the clay film at 40° C. and a relative humidity of 90% according to the cup method (JIS Z 0208), it was found to be one-third that prior to coating. In addition, in the case of dropping water onto the clay film while allowing to remain undisturbed in the horizontal position, the clay film rejected the water satisfactorily, thereby confirming that water repellency had been imparted to the clay film. In this manner, a clay film was obtained having low gas impermeability and water vapor transmission as well as surface water repellency by producing a coating layer on both sides thereof.

Example 2

(1) Production of Clay Film 20 cm$^3$ of distilled water were added to 0.95 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. An aqueous solution containing 0.09 g of an additive in the form of epsilon-caprolactam (Wako Pure Chemical Industries, Ltd.) was added to this dispersion to obtain a homogeneous dispersion. The resulting dispersion was coated onto a brass plate having a length of about 30 cm and width of about 20 cm, and dried while maintaining the plate in a level state in a forced air oven under temperature conditions of 60° C. for 1 hour to obtain a homogeneous water-soluble polymer-compounded clay thin film having a thickness of about 60 micrometers. The formed clay thin film was then peeled from the tray to obtain a clay film. Next, an ethanol solution of an acrylic resin and methylphenyl polysiloxane was sprayed onto both sides of the clay film to improve the mechanical strength thereof followed by drying at room temperature to form a coating layer comprising acrylic resin and methylphenyl polysiloxane. The thickness of the coating layer was about 1 micrometer.

(2) Characteristics of Clay Film

The permeability coefficient of the clay film at room temperature with respect to air, oxygen gas, nitrogen gas, hydrogen gas or helium gas was less than $1\times10^{-12}$ cm$^2$s$^{-1}$ cmHg$^{-1}$. The tensile strength of the clay film was 21.6 MPa (JIS K 7127), demonstrating a value higher than the value of 18.9 MPa obtained prior to coating. In this manner, a clay film having high tensile strength was obtained by producing a coating layer on both sides thereof. In this manner, a stronger clay film was obtained having extremely low gas permeability by producing a coating layer on both sides thereof.

Example 3

(1) Production of Clay film 60 cm$^3$ of distilled water were added to 1.82 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. 0.10 g of a reinforcing material in the form of glass wool were added to this dispersion followed by the addition of an aqueous solution containing 0.18 g of an additive in the form of epsilon-caprolactam (Wako Pure Chemical Industries, Ltd.), and coating the resulting dispersion onto a portion of a brass plate having a length of about 30 cm and width of about 20 cm to a uniform thickness, allowing the plate to stand undisturbed in a level state, and drying in a forced air oven under temperature conditions of 60° C. for 30 minutes to obtain a homogeneous water-soluble polymer-compounded clay thin film having a thickness of about 60 micrometers. Next, the formed clay thin film was then peeled from the tray to obtain a clay film. Next, the clay film was heated at 20° C. for a predetermined amount of time to obtain a clay film of polymerized epsilon-caprolactam containing Nylon 6.

(2) Characteristics of Clay Film

Figure 2:
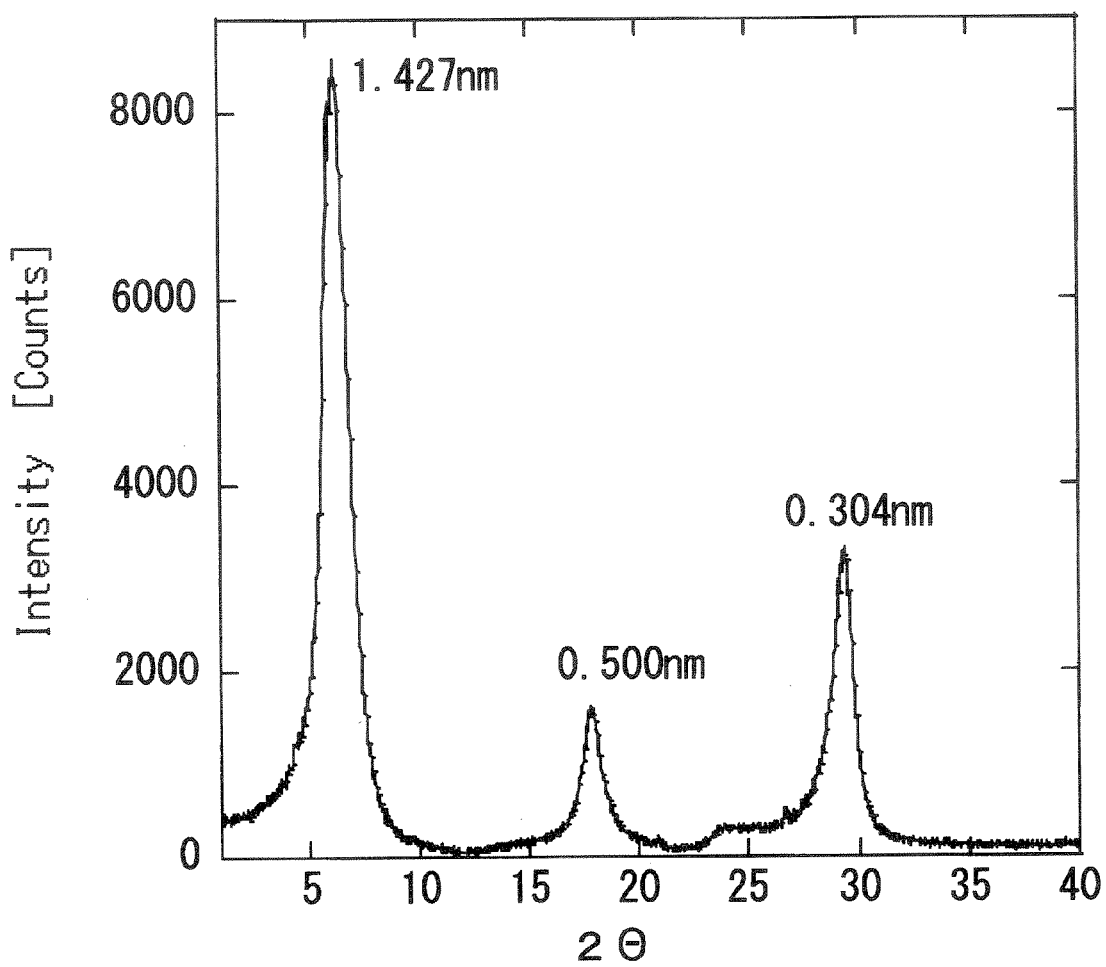
FIG. 2 shows an X-ray analysis chart of a clay film.
Figure 3:
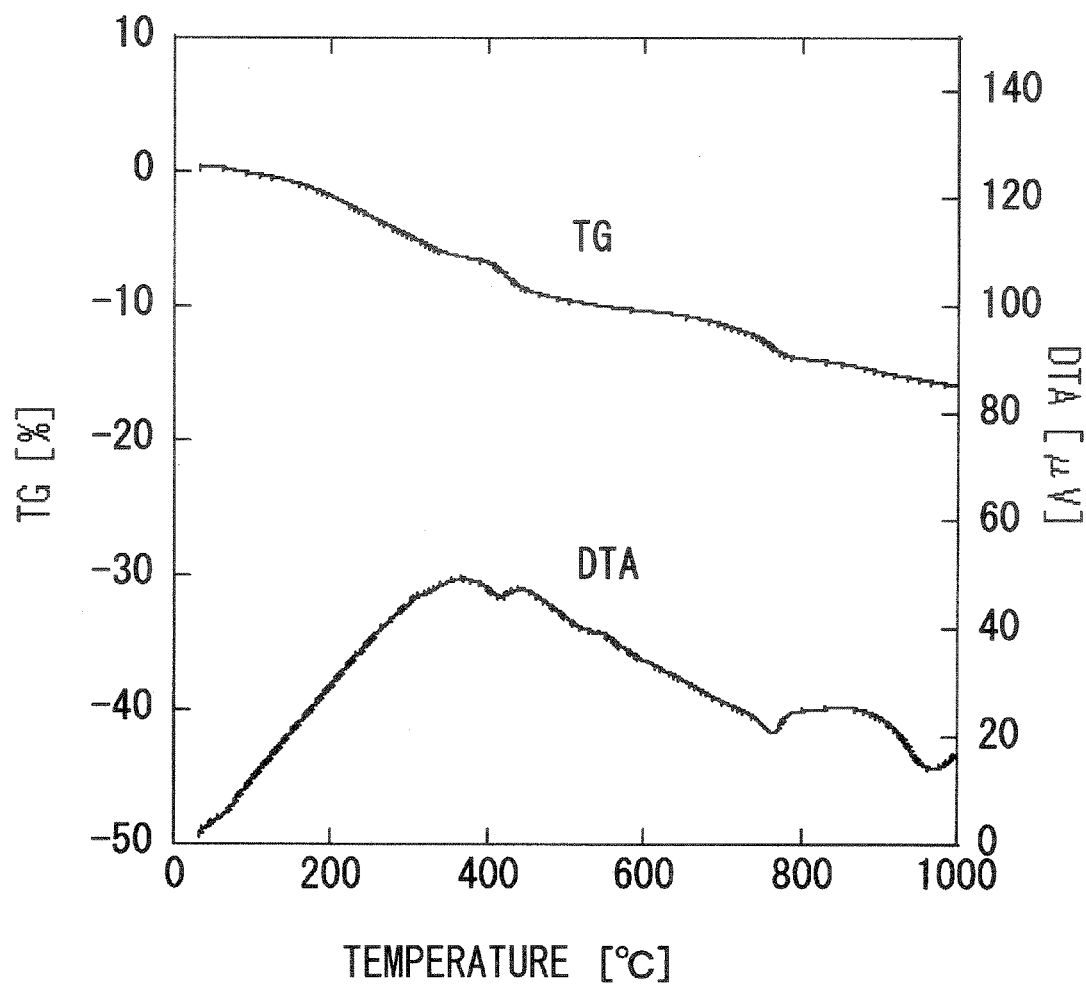
FIG. 3 shows a TG-DTA chart of a clay film.

The permeability coefficient of the clay film at room temperature with respect to air, oxygen gas, nitrogen gas, hydrogen gas or helium gas was less than $1\times10^{-12}$ cm$^2$s$^{-1}$ cmHg$^{-1}$. The tensile strength of the clay Film according to JIS K 7127 was 38 Mpa or more. Thus, a clay film having high tensile strength was obtained as a result of adding the reinforcing material. A photograph of the clay film taken with a scanning electron microscope is shown in FIG. 1. FIG. 1 shows the surface of the clay film. The clay film can be seen to be reinforced as a result of individual longs each of narrow glass wool fibers running vertically and horizontally through the film resulting in the formation of a network. In an X-ray analysis chart of this clay film (FIG. 2), a series of sharp, bottom reflection peaks (001), (003) and (005) were observed at locations of 1.43, 0.50 and 0.30 nm, respectively, indicating that the orientation of the particles of the clay thin film was aligned well. In addition, these values were larger than the values of 1.24, 0.42 and 0.21 nm, respectively, obtained in the case of producing a film composed of natural montmorillonite only, thus indicating a nanocomposite in which Nylon particles were incorporated between the clay layers. On the basis of the TG-DTA chart of this clay film (FIG. 3), weight loss resulting from heating from 200 to 600° C. was only 6.15% This indicates that the clay film has a high degree of heat resistance.

Comparative Example 1

(1) Production of Clay Film 60 cm$^3$ of distilled water were added to 1.82 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. An aqueous solution containing 0.18 g of an additive in the form of epsilon-caprolactam (Wako Pure Chemical Industries, Ltd.) was then added to this dispersion, and the resulting dispersion was coated onto a portion of a brass plate having a length of about 30 cm and width of about 20 cm to a uniform thickness, followed by allowing the plate to stand undisturbed in a level state, and drying in a forced air oven under temperature conditions of 60° C. for 30 minutes to obtain a homogeneous water-soluble polymer-compounded clay thin film having a thickness of about 60 micrometers. Next, the formed clay thin film was then peeled from the tray to obtain a clay film. Next, the clay film was heated at 250° C. for a predetermined amount of time to obtain a clay film of polymerized epsilon-caprolactam containing Nylon 6.

(2) Characteristics of Clay Film

The permeability coefficient of the clay film at room temperature with respect to air, oxygen gas, nitrogen gas, hydrogen gas or helium gas was less than $1\times10^{-12}$ cm$^2$s$^{-1}$ cmHg$^{-1}$. The tensile strength of the clay film was 19 MPa. Thus, tensile strength was demonstrated to be lower when not using a reinforcing material as compared with the case of using a reinforcing material (Example 3).

Example 4

(1) Production of Multilayer Film

A glass plain-woven fabric (Glass Cloth, Solar Co., Ltd.) was laid on a brass plate having a length of about 30 cm and width of about 20 cm, the glass plain-woven fabric being slightly smaller than the brass plate. The thickness of the Glass Cloth was about 0.1 mm. Next, 60 cm$^3$ of distilled water were added to 2 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. This dispersion was coated onto the glass plain-woven fabric, allowed to stand undisturbed in a level state, and dried in a forced air oven under temperature conditions of 60° C. for 30 minutes to obtain a multilayer film having a thickness of about 0.2 mm.

(2) Characteristics of Multilayer Film

Figure 4:
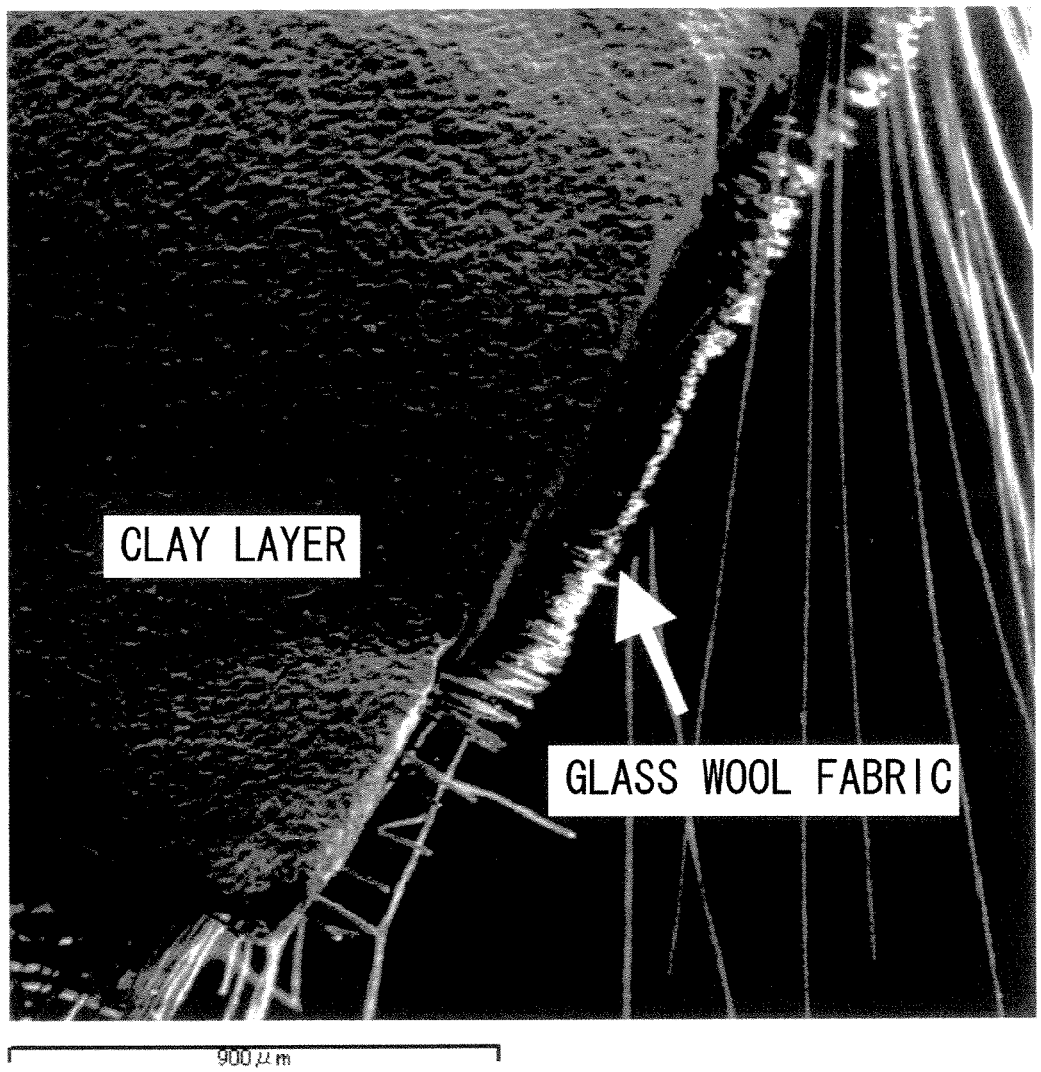
FIG. 4 shows a photograph taken with a scanning electron microscope of the flat surface on the side having a clay layer of a multilayer film of the present invention.
Figure 5:
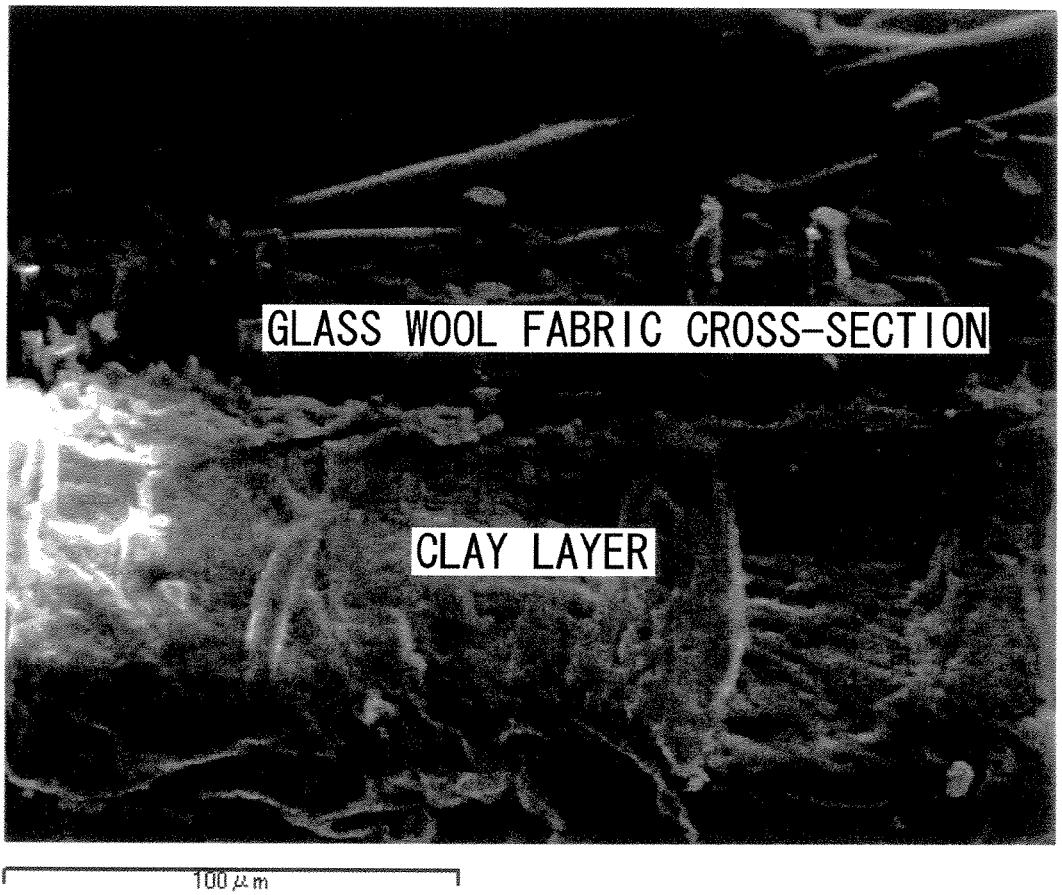
FIG. 5 shows a photograph taken with a scanning electron microscope of the cross-section of a multilayer film of the present invention.

The permeability coefficient of the multilayer film at room temperature with respect to air, oxygen gas, nitrogen gas, hydrogen gas or helium gas was less than $1\times10^{-12}$ cm$^2$s$^{-1}$ cmHg$^{-1}$. Weight loss resulting from heating from 200 to 600° C. as determined by thermogravimetric measurement of the multilayer film was only 0.23% According to scanning electron micrographs (FIGS. 4 and 5), a clay layer can be seen to be densely formed on one side of the glass plain-woven fabric. In addition, the gas permeability coefficient of the multilayer film following heat treatment for 24 hours at 600° C. was less than $1\times10^{-12}$ cm$^2$ s$^{-1}$ cmHg$^{-1}$. On the basis of these findings, this multilayer film demonstrated a high degree of heat resistance. As a result of measuring the direct current electrical resistance in the perpendicular direction to the film according to the AC two-probe method, the electrical resistance of the multilayer film was found to be 1 megaohm or more.

Example 5

(1) Production of Multilayer Film

A glass plain-woven fabric (Glass Cloth, Solar Co., Ltd.) was laid on a brass plate having a length of about 30 cm and width of about 20 cm, the glass plain-woven fabric being slightly smaller than the brass plate. The thickness of the glass cloth was abut 0.1 mm. Next, 60 cm$^3$ of distilled water were added to 1.82 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. An aqueous solution containing 0.18 g of an additive in the form of epsilon-caprolactam (Wake Pure Chemical Industries, Ltd.) was then added to this dispersion, the resulting dispersion was coated onto the glass plain woven fabric, allowed to stand undisturbed in a level state, and dried in a forced air oven under temperature conditions of 60° C. for 30 minutes to obtain a multilayer film having a thickness of about 0.2 mm. Next, the formed multilayer film was peeled from the tray to obtain a self-supporting multilayer film. Next, this multilayer film was heated at 250° C. for a predetermined amount of time to obtain a multilayer film of polymerized epsilon-caprolactam containing Nylon 6.

(2) Characteristics of Multilayer Film

The permeability coefficient of the multilayer film at room temperature with respect to air, oxygen gas, nitrogen gas, hydrogen gas or helium gas was less than $1\times10^{-12}$ cm$^2$s$^{-1}$ cmHg$^{-1}$. In addition, the gas permeability coefficient of the multilayer film following heat treatment for 24 hours at 600° C. was less than $1\times10^{-12}$ cm$^2$s$^{-1}$ cmHg$^{-1}$. On the basis of these findings, this multilayer film demonstrated a high degree of heat resistance. As a result of measuring the direct current electrical resistance in the perpendicular direction to the film according to the AC two-probe method, the electrical resistance of the multilayer film was found to be 1 megaohm or more.

Example 6

(1) Production of Adhesive Clay Film 60 cm$^3$ of distilled water were added to 2 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. This dispersion was coated onto a brass plate having a length of about 30 cm and width of about 20 cm to a thickness of about 2 mm, followed by allowing the plate to stand undisturbed in a level state, drying in a forced air oven under temperature conditions of 60° C. for 30 minutes and peeling to obtain a clay layer having a thickness of about 0.04 mm. Next, one of the adhesive sides of a double-sided adhesive sheet (Nitto Denko Corp.) was adhered to the clay layer to produce an adhesive clay film. The thickness of the adhesive sheet was 0.15 mm, the adhesive was a solvent-free acrylic clay film, and the base layer was a non-woven fabric.

(2) Production of Multilayer Clay Film

A multilayer clay film was produced by laminating a clay layer having a thickness of about 0.04 mm onto the adhesive side of the adhesive clay film produced in (1) above. The total thickness of the multilayer clay film was about 0.23 mm.

(3) Characteristics of Multilayer Clay Film

Figure 6:
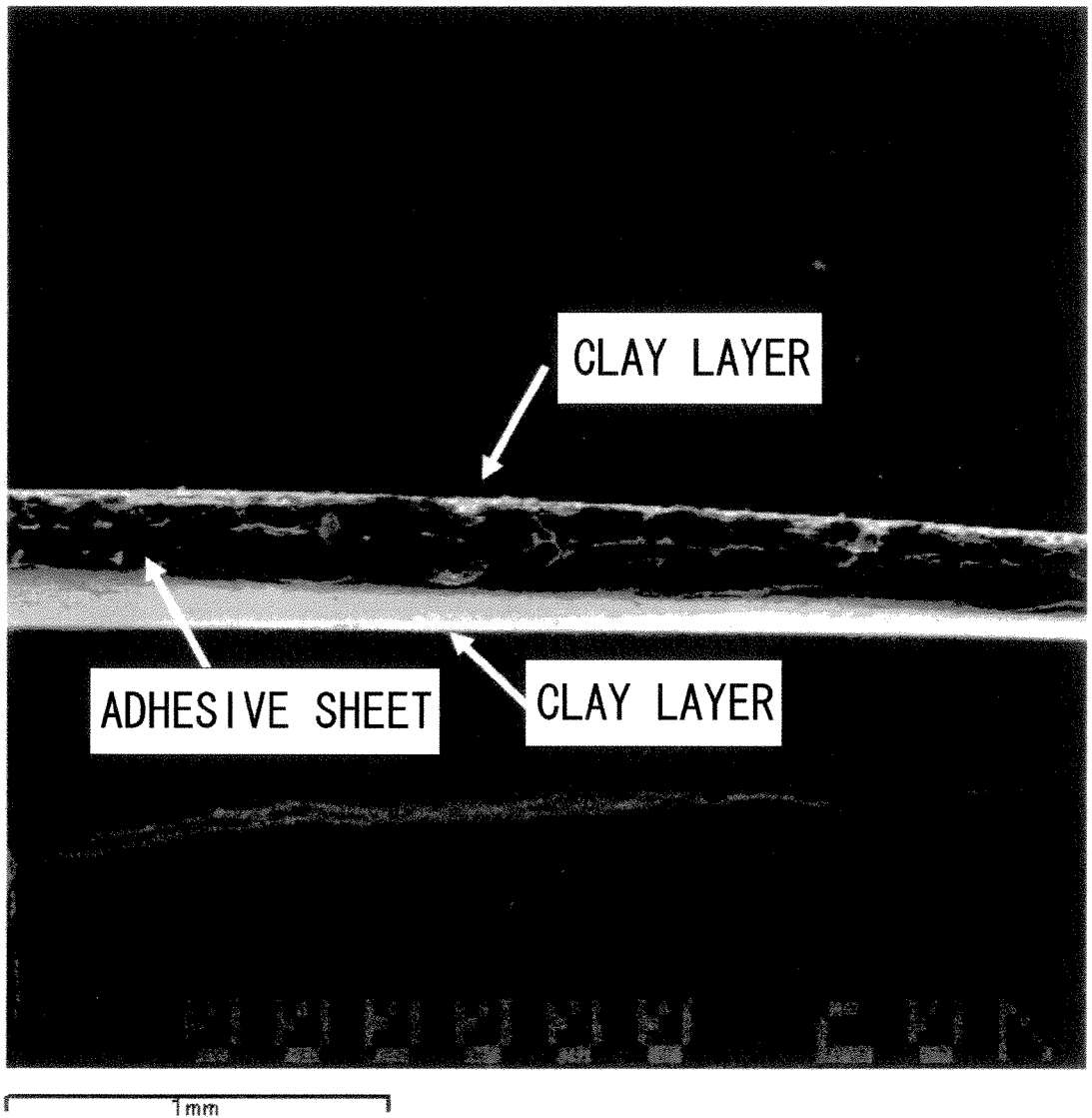
FIG. 6 shows a photograph taken with a scanning electron microscope of the cross-section of a multilayer clay film in which an adhesive clay film has been adhered to another clay film.

The permeability coefficient of the multilayer film at room temperature with respect to helium gas was less than $1 \times 10^{-2}$ cm$^2$s$^{-1}$ cmHg$^{-1}$. According to a scanning electron micrograph (FIG. 6), the double-sided adhesive sheet and the clay layer can be seen to be uniformly and firmly adhered resulting in the formation of a dense film. As a result of measuring the direct current electrical resistance in the perpendicular direction to the film according to the AC two-probe method, the electrical resistance of the multilayer film was found to be 1 megaohm or more.

Example 7

(1) Production of Adhesive Clay Film 60 cm$^3$ of distilled water were added to 2 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. This dispersion was coated onto a brass plate having a length of about 30 cm and width of about 20 cm to a thickness of about 2 mm followed by allowing the plate to stand undisturbed in a level state, drying in a forced air oven under temperature conditions of 60° C. for 30 minutes and peeling to obtain a clay layer having a thickness of about 0.04 mm. Next, one of the adhesive sides of a double-sided adhesive sheet (Nitto Denko Corp.) was adhered to the clay layer to produce an adhesive clay film. The thickness of the adhesive sheet was 0.15 mm the adhesive was a solvent-free acrylic clay film, and the base layer was a non-woven fabric.

(2) Production of Multilayer Clay Film

A multilayer clay film was produced by laminating a polyethylene film having a thickness of about 0.04 mm onto the adhesive side of the adhesive clay film produced in (1) above. The total thickness of the multilayer clay film was about 0.23 mm.

(3) Characteristics of Multilayer Film

The permeability coefficient of the multilayer film at room temperature with respect to helium gas was less than $1 \times 10^{-12}$ cm$^2$s$^{-1}$ cmHg$^{-1}$. This value is extremely lower than the value of $6.6 \times 10^{-10}$ cm$^2$s$^{-1}$ cmHg$^{-1}$ for a polyethylene film having a thickness of about 0.04 mm alone, thereby confirming the imparting of gas impermeability by the clay layer. As a result of measuring the direct current electrical resistance in the perpendicular direction to the film according to the AC two-probe method, the electrical resistance of the multilayer film was found to be 1 megaohm or more.

Example 8

(1) Production of Clay Film 60 cm$^3$ of distilled water were added to 1.82 g of clay in the form of natural montmorillonite (Kunipia P, Kunimine Industries Co., Ltd.) and placed in a plastic sealed container along with a Teflon (registered trademark) rotor followed by agitating vigorously to obtain a homogeneous dispersion. An aqueous solution containing 0.18 g of an additive in the form of epsilon-caprolactam (Wako Pure Chemical Industries, Ltd.) was then added to this dispersion, and the resulting dispersion was coated onto a portion of a brass plate to a uniform thickness, followed by allowing the plate to stand undisturbed in a level state, and drying in a forced air oven under temperature conditions of 60° C. for 1 hour to obtain a homogeneous water-soluble polymer-compounded clay thin film having a thickness of about 80 micrometers. Next, the formed clay thin film was then peeled from the tray to obtain a clay film.

(2) Production of Clay Film

The clay film produced in (1) above was immersed in mineral oil IRM903 using a method in compliance with JIS K 6258: 2003 entitled "Rubber, vulcanized or thermoplastic—Determination of the effect of liquids" followed by treating for 72 hours at 150° C. to obtain a heal-treated clay film.

(3) Characteristics of Clay Film

The tensile strength of this heat-treated clay film at room temperature was 59 MPa. On the other hand, the tensile strength of the clay film not subjected to heat treatment was 19 MPa. The water repellency of the heat-treated clay film was satisfactory, and an improvement in water resistance was observed as compared with the clay film not subjected to heat treatment.

INDUSTRIAL APPLICABILITY

As has been described above, the present invention relates to a clay film and a production process and so forth thereof, and is able to provide a novel clay film able to be used under high-temperature conditions having low moisture permeability and gas permeability, a water-repellent and waterproof surface, mechanical strength enabling use as a self-supporting film and superior flexibility, and provide a production process thereof along with a clay film product. The present invention is able to provide a film having superior moisture resistance and heat resistance. In addition, since the clay thin film of the present invention can be used as a self-supporting film, has superior moisture resistance, heat resistance and flexibility, and has superior gas impermeability, it can be used, for example, as a packing material used in pipe connections in chemical industrial fields. In addition, according to the present invention, a method can be provided for producing the above-mentioned clay film by a simple process without generating waste liquid. In addition, the present invention relates to a fiber-reinforced clay film and a production process thereof, and is able to provide a novel clay film, and a production technology thereof, able to be used under high-temperature conditions having mechanical strength enabling use as a self-supporting film and superior flexibility. In addition, the present invention relates to a multilayer film, a production process thereof and applications thereof, and is able to provide a novel multilayer film a production technology thereof and a multilayer film product, able to used under high-temperature conditions having mechanical strength enabling use as a self-supporting film and superior flexibility. Moreover, the present invention relates to an adhesive clay film, and is able to provide a novel adhesive clay film having mechanical strength enabling use as a self-supporting film, having high gas impermeability, having superior flexibility, enabling the thickness thereof to be easily, uniformly and reliably increased by being laminated with itself, and enabling adhesion with the surface of another material to be carried easily, uniformly and reliably. Since the clay film of the present invention has superior gas impermeability, insulating properties and heat resistance, it can be used as a substitute for asbestos in fields such as packings, gaskets, heat insulators and fireproofing materials.

The invention claimed is:

1. A surface treated clay film comprising:
a clay as a main component;
an additive, which is present in an amount of 30 wt. % or less; and
a reinforcing material, which is present in an amount of 1-10 wt. %,
wherein the additive is present and is one or more additives selected from the group consisting of an ethylene glycol, a glycerin, an epsilon-caprolactam, a dextrin, a starch, a cellulose-based resin, a gelatin, an agar, a flour, a gluten, an alkyd resin, a polyurethane resin, an epoxy resin, a fluororesin, an acrylic resin, a methacrylic resin, a phenolic resin, a polyamide resin, a polyester resin, a polyimide resin, a polyvinyl resin, a polyethylene glycol, a polyacrylamide, a polyethylene oxide, a protein, a deoxyribonucleic acid, a ribonucleic acid, a polyamino acid, a phenolic compound, and a benzoic acid compound,
wherein the reinforcing material is one or more reinforcing materials selected from the group consisting of a mineral fiber, a glass wool, a ceramic fiber, a plant fiber, a carbon fiber, and an organic polymer fiber,
wherein a surface of the surface treated clay film has been subjected to one or more surface treatments selected from the group consisting of a water repellency treatment, a waterproofing treatment, a reinforcing treatment and a surface flattening treatment,
wherein the surface treated clay film has tensile strength and is self-supporting,
wherein the surface treated clay film has flexibility, with a bending resistance of less than 8.0 mN, and
wherein the surface treated clay film has heat resistance and gas impermeability, with a gas permeability coefficient with respect to air, oxygen gas, nitrogen gas, hydrogen gas or helium gas of less than $1 \times 10^{-12}$ cm$^2$s$^{-1}$ cmHg$^{-1}$ at room temperature.

2. The surface treated clay film according to claim 1, wherein the clay is one or more clays selected from the group consisting of a natural clay and a synthetic clay.

3. The surface treated clay film according to claim 1, wherein the clay is one or more natural clays.

4. The surface treated clay film according to claim 1, wherein the clay is one or more synthetic clays.

5. The surface treated clay film according to claim 1, wherein the clay is one or more clays selected from the group consisting of a smectite clay, a mica clay, a vermiculite clay, a montmorillonite clay, an iron montmorillonite clay, a beidellite clay, a saponite clay, a hectorite clay, a stevensite clay and a nontronite clay.

6. The surface treated clay film according to claim 1, wherein the additive is present in an amount of 1-30 wt. %.

7. The surface treated clay film according to claim 1, wherein the additive is present in an amount of 1-10 wt. %.

8. The surface treated clay film according to claim 1, wherein a coating layer on the surface of the surface treated clay film has been formed by the surface treatment, and wherein the coating layer is selected from the group consisting of a fluorine-based layer, a silicon-based layer, a polysiloxane layer, a fluorine-containing organopolysiloxane layer, an acrylic resin layer, a vinyl chloride resin layer, a polyurethane resin layer, a water repellent layer, a water repellent layer, a metal layer, a carbon layer, and combinations thereof.

9. The surface treated clay film according to claim 1, wherein the surface of the surface treated clay film is hydrophobic.

10. The surface treated clay film according to claim 1, wherein a chemical bond has been formed in or between the clay, the additive and/or the reinforcing material by a chemical reaction.

11. The surface treated clay film according to claim 1, wherein a chemical bond has been formed in or between the clay, the additive and/or the reinforcing material by a chemical reaction selected from the group consisting of an addition reaction, a condensation reaction and a polymerization reaction.

12. The surface treated clay film according to claim 1, wherein a chemical bond has been formed in or between the clay, the additive and/or the reinforcing material by application of heat or irradiation.

13. The surface treated clay film according to claim 1, wherein a chemical bond has been formed in or between the clay, the additive and/or the reinforcing material by application of a mineral oil and heat.

14. The surface treated clay film according to claim 1, which has a tensile strength of at least 30 MPa.

15. The surface treated clay film according to claim 1, which has a density of greater than 1.51 g/cm$^3$.

16. The surface treated clay film according to claim 1, which has a direct current electrical resistance in a direction perpendicular to the surface treated clay film of at least 1 MΩ.

17. The surface treated clay film according to claim 1, which has a bending resistance of 2.0-8.0 mN.

18. The surface treated clay film according to claim 1, wherein the surface treated clay film has a gas permeability coefficient with respect to air, oxygen gas, nitrogen gas, hydrogen gas or helium gas of less than $1 \times 10^{-12}$ cm$^2$s$^{-1}$ cmHg$^{-1}$ following a heat treatment carried out at 600° C. for 24 hours under atmospheric pressure.

19. The surface treated clay film according to claim 1, which has a thickness of less than 1 mm and a surface area of greater than 1 cm$^2$.

20. A member comprising:
a material selected from the group consisting of a sealing material, a water-repellant material, a heat-resistant material, an insulating material, a heat insulating material and an electrical insulating material; and
the surface treated clay film according to claim 1.

21. The surface treated clay film according to claim 1, wherein the surface treated clay film does not comprise a polyamide resin.

22. The surface treated clay film according to claim 1, wherein the clay is present in an amount of >50 wt. %.

23. The surface treated clay film according to claim 1, wherein the clay is present in an amount of $\geqq$60 wt. %.

24. The surface treated clay film according to claim 1, wherein the clay is present in an amount of $\geqq$80 wt. %.

25. The surface treated clay film according to claim 1, wherein the clay is present in an amount of $\geqq$90 wt. %.

26. The surface treated clay film according to claim 1, wherein the clay is present in an amount of $\geqq$98 wt. %.

27. The member according to claim 20, wherein the additive is present in an amount of 1-30 wt. %.

28. The member according to claim 20, wherein the additive is present in an amount of 1-10 wt. %.

* * * * *